United States Patent [19]

Waechter

[11] Patent Number: 4,671,215
[45] Date of Patent: Jun. 9, 1987

[54] LIQUID INJECTION SYSTEM WITH VENTURI INJECTOR

[76] Inventor: Kenneth F. Waechter, 3127 W. Tufts Ave., Englewood, Colo. 80110

[21] Appl. No.: 723,843

[22] Filed: Apr. 16, 1985

[51] Int. Cl.$^4$ .............................................. F02M 25/04
[52] U.S. Cl. .................................. 123/25 L; 123/25 A
[58] Field of Search ................. 123/25 A, 25 E, 25 L, 123/25 R

[56] References Cited

U.S. PATENT DOCUMENTS

| | | | |
|---|---|---|---|
| 2,675,788 | 4/1954 | Porter et al. | 123/25 L |
| 2,681,048 | 6/1954 | Fox | 123/25 L |
| 2,687,120 | 8/1954 | Malec | 123/25 L |
| 2,756,729 | 7/1956 | Wolcott | 123/25 L |
| 3,530,842 | 9/1970 | Brimer | 123/25 E |
| 3,537,434 | 11/1970 | Herpin | 123/25 E |
| 3,749,376 | 7/1973 | Alm et al. | 123/25 E |
| 4,306,520 | 12/1981 | Slaton | 123/25 A |
| 4,364,370 | 12/1982 | Smith et al. | 123/575 |
| 4,397,268 | 8/1983 | Brown | 123/25 L |
| 4,418,654 | 12/1983 | Keiun | 123/25 A |
| 4,448,153 | 5/1984 | Miller | 123/25 J |

OTHER PUBLICATIONS

J. C. Whitney & Co., Catalog #485B.
MPG Performance Products.

Primary Examiner—Ira S. Lazarus
Attorney, Agent, or Firm—Norvell E. Von Behren

[57] ABSTRACT

A liquid injection system using a novel venturi injector and a novel liquid level control chamber for use in an internal combustion engine. The injection system uses water and/or a water/alcohol mix in the preferred embodiment which is pumped from a remote liquid level tank to a liquid level control chamber. A venturi injector is positioned within the internal combustion air cleaner housing to inject predetermined amounts of liquid into the carburetor of the internal combustion engine. The rushing air within the air cleaner passing through the venturi injector causes water to be pulled into the venturi and into the throat of the carburetor from the liquid level control chamber. Control means is provided in the system to control the pump to supply more liquid to the liquid level control chamber from the remote liquid tank.

21 Claims, 13 Drawing Figures

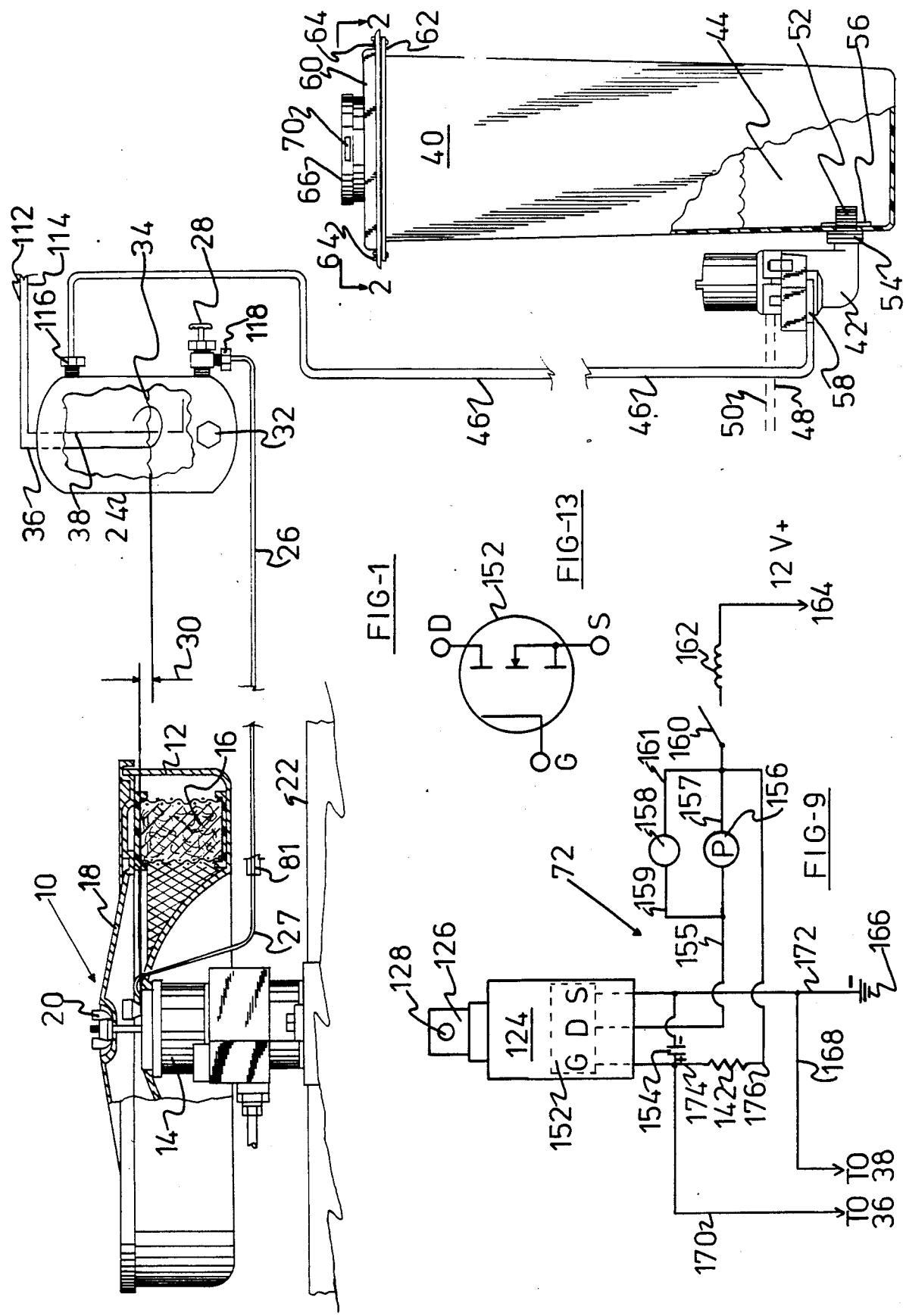

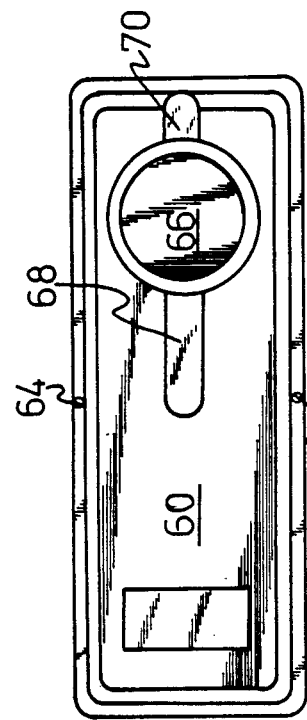
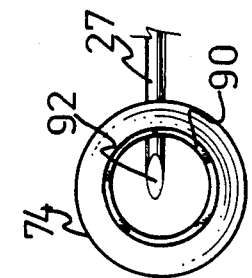
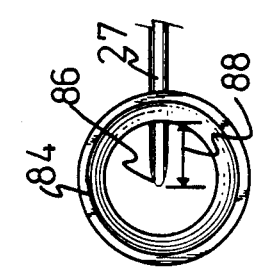
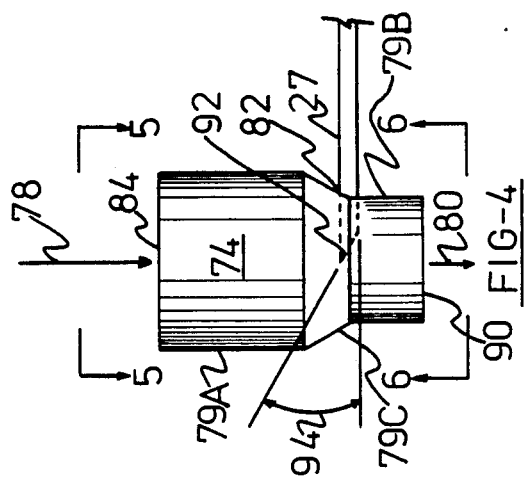
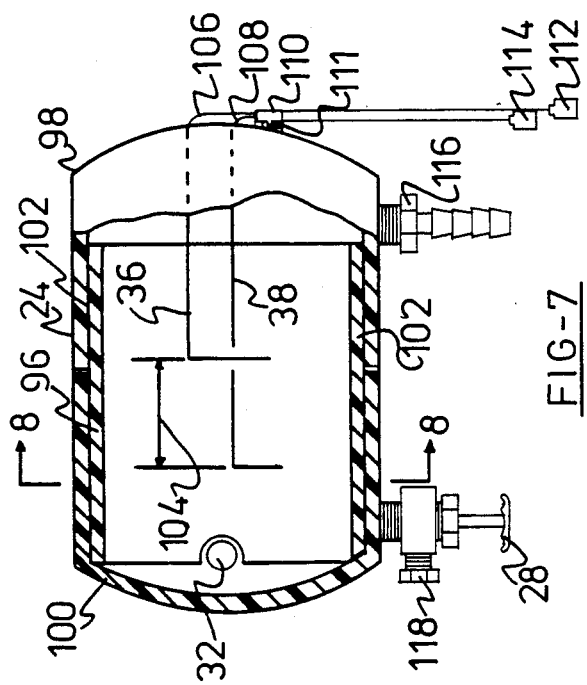
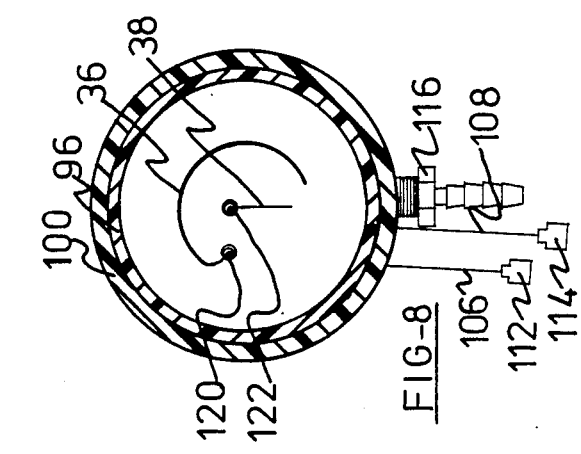

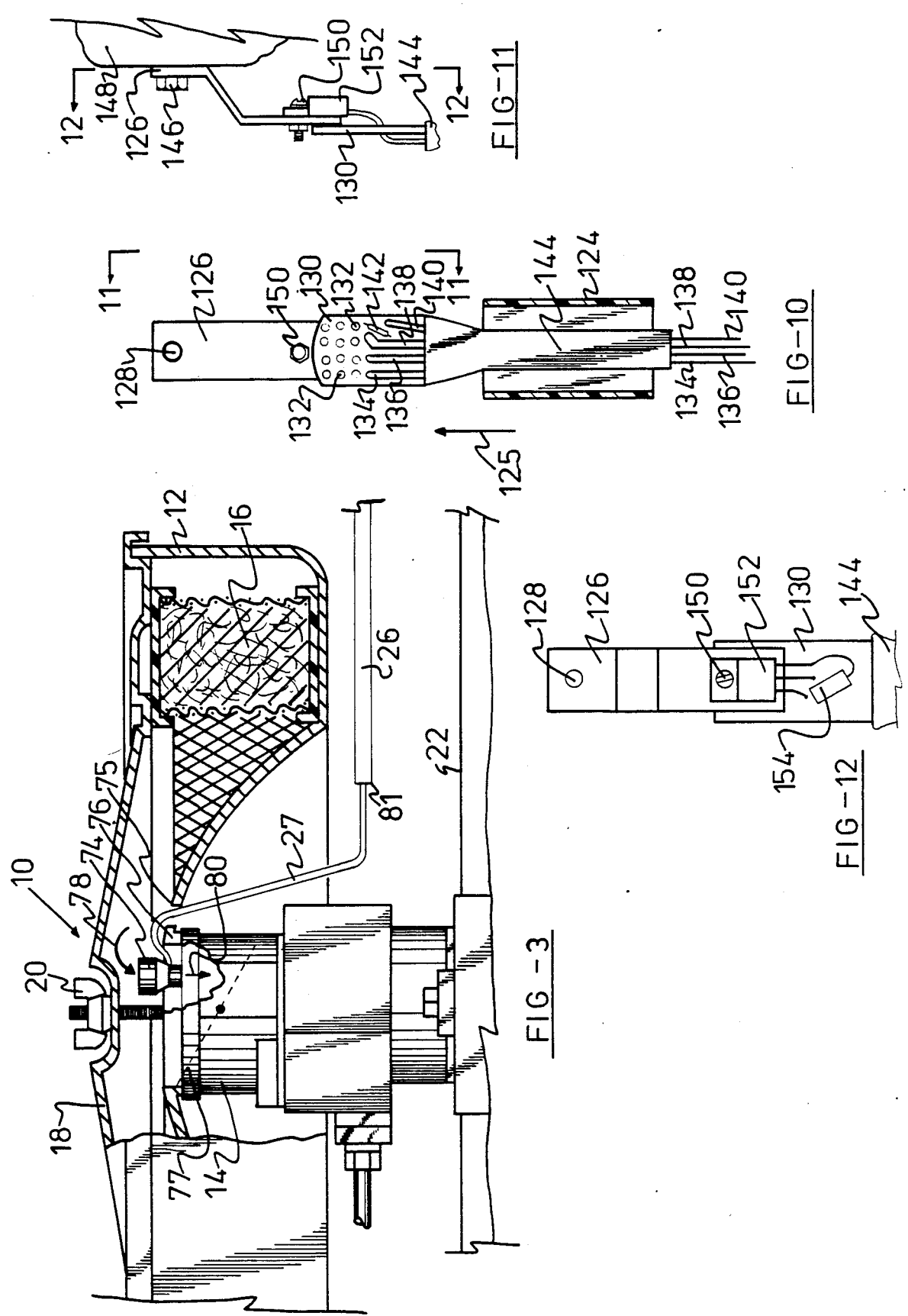

LIQUID INJECTION SYSTEM WITH VENTURI INJECTOR

BACKGROUND OF THE INVENTION

This invention relates to a liquid injection system in general and in particular to a new and novel injection system for use in an internal combustion engine.

It is becoming more desirable to provide systems for use on internal combustion engines which will reduce engine exhaust pollutants and increase the fuel mileage of the internal combustion engine as well as increasing the power output of the engine. Various forms of liquid vaporizing attachments for injecting water and/or a water-alcohol mixture into the internal combustions have been tried over the years.

For example in the U.S. Pat. No. 4,364,370, issued Dec. 21, 1982 to Byron D. Smith et al there is taught a water injection system which injects water, alcohol, or a mixture of water and alcohol into the air intake of an internal combustion engine by the use of an electric motor driven pump that delivers the fuel under pressure to a nozzle mounted on the cover of an air cleaner above the air inlet of the carburetor. A similar system is taught in the U.S. Pat. No. 4,448,153, issued May 15, 1984 to Robert J. Miller.

Other systems for injection of liquid into an internal combustion engine are taught in the U.S. Pat. No. 4,397,268, issued Aug. 9, 1983 to Charles L. Brown which uses a venturi effect to draw moisture from a remote liquid supply tank through a porous venturi tube positioned within the air flow inlet to the internal combustion engine. A similar system is taught in the U.S. Pat. No. 4,418,654, issued Dec. 6, 1983 to Kodo Keium.

A different type of system is taught in the U.S. Pat. No. 4,306,520, issued Dec. 22, 1981 to David E. Slaton which uses engine vacuum in an air cleaner chamber to draw water from the chamber into the air cleaner housing of the internal combustion engine.

Another type of system on the market today is a system manufactured by MPG Performance Products of Newberry Park, Calif. and distributed under the trade name of Vari-Flow Injector. This system consists of a twelve-volt water pump that develops 6½ pounds per square inch pressure and a sensing control that monitors the engine load. When the system is turned on the water pump provides water to the sensing control at the given pressure with the sensing control including a valve that is controlled by engine manifold vacuum. Other water injection systems are available on the marketplace and are being sold by the J.C. Whitney & Co. of Chicago, Ill. The various systems heretofore mentioned in the patents and on the marketplace today generally involve positive water injection by electronic control using pumps and nozzles to accomplish the injection. From the applicants knowledge and from his prior art search, no system can be found using the applicants novel venturi injector system using the novel venturi injector in combination with the novel liquid level control chamber as hereinafter described.

SUMMARY OF THE INVENTION

In order to overcome problems and difficulties inherent in the before mentioned prior art devices, there is provided by the applicants invention a new and novel liquid injection system for use with an internal combustion engine that uses a novel venturi injector positioned within the air cleaner housing in proximity to the carburetor air intake to be responsive to changes in vacuum in the air cleaner housing caused by changes in load on the internal combustion engine. The novel venturi injector is connected to a liquid level control chamber having novel features which are positioned outside of the air cleaner housing and has a predetermined liquid level contained within the chamber with the chamber being positioned at a predetermined level relative to the venturi injector. A remote liquid level tank is positioned in proximity or remotely to the liquid level control chamber and supplies precontrolled amounts of liquid to the liquid level control chamber by means of a pump and pump control which activates or deactivates the pump responsive to a preset liquid level in the liquid level control chamber.

The applicants novel liquid injection system does not supply liquid under pressure to the internal combustion engine but supplies liquid by a pump from a remote liquid tank to the novel liquid level control chamber. Responsive to low changes in the internal combustion engine, the novel venturi injector draws the liquid from the liquid level control chamber through the venturi injector and into the carburetor to supply the desired water and/or alcohol or water-alcohol mixture to the engine.

Accordingly it is an object and advantage of the invention to provide a new and novel liquid injection system using a new and novel venturi injector positioned partly within the carburetor and in the air cleaner housing of an internal combustion engine.

Another object and advantage of the invention is to provide a new and novel liquid level control chamber which has novel features making the chamber responsive to changes in water level in the chamber with the chamber being able to call for more water from a remote liquid tank to supply water level into the chamber.

Yet another object and advantage of the invention is to provide a novel venturi injector for use in a liquid injection system whereby the venturi injector is formed from a reducing tube fitting and is constructed from a portion of the connecting tubing being positioned in the venturi injector.

These and other objects and advantages of the invention will become apparent from a review of the description of the preferred embodiment to be presented hereinafter and from a study of the drawings which show the preferred embodiment. In developing the preferred embodiment, the applicant experimented on his 1979 motor home which lacked adequate power at times especially during travel in the mountains. Water injection systems presently on the market at that time were not reliable nor satisfactory and experiments began trying to inject water into the motor home in a way similar to the way that gasoline was injected into an engine.

The initial experiments consisted of using parts of an old carburetor which was cut apart and had the water supply tank mounted higher than the float chamber of the old carburetor. The venturi of the carburetor was removed and mounted inside the throat of the vehicle carburetor with the level of water in the float chamber being controlled by the old carburetor float.

While the initial system worked satisfactory, water in the old carburetor caused the metal to corrode resulting in a second experimental system being made of plastic pipe caps with a mercury-tube switch being mounted on a hinge-type device in the top cap. A fishing bobber was used to move the end of the mercury tube up and down, causing the switch to control a pump mounted near the supply tank. Several types of floats were tried initially but the problem of a erratic pump action caused by movement of the mercury in the switch remained a major problem.

Experimentation continued with several circuits and various other components ultimately resulting in the present new and novel system having satisfactory dependability with easily obtainable parts used in the system.

BRIEF DESCRIPTION OF THE DRAWINGS

FIG. 1 is a side view, shown partially in section, showing the applicants novel liquid injection system for use with an internal combustion engine.

FIG. 2 is a top plan view, taken along lines 2—2 of FIG. 1 showing the top of the remote liquid tank used in the injection system.

FIG. 3 is an enlarged side view, similar to a portion of FIG. 1 showing the applicants novel venturi injector positioned within an air cleaner housing of an internal combustion engine.

FIG. 4 is an enlarged side view of the venturi injector shown in FIG. 3.

FIG. 5 is a top plan view, taken along lines 5—5 of FIG. 4.

FIG. 6 is a bottom plan view, taken along lines 6—6 of FIG. 4.

FIG. 7 is a side view, partially in section, showing in detail the liquid level control chamber used in the applicants liquid injection system.

FIG. 8, is a cross-sectional view, taken along lines 8—8 of FIG. 7.

FIG. 9 is a schematic view of the control circuit used with the applicants liquid injection system.

FIG. 10 is a top plan view of the transistor and heat sink used in the applicants control circuit of FIG. 9.

FIG. 11 is a side view, taken along lines 11—11 of FIG. 10 showing in more detail the mounting of the heat sink to the transistor unit.

FIG. 12 is a bottom view, taken along lines 12—12 of FIG. 11.

FIG. 13 is an electrical schematic of the Power Mosfet transistor used in the circuit of FIG. 9.

DESCRIPTION OF THE PREFERRED EMBODIMENT

Referring now to the drawings in general and in particular to FIG. 1 of the drawings there is shown the applicants venturi injector, shown generally by the arrow 10 which would be positioned within an air cleaner housing 12 and would be mounted partially within the carburetor 14 centrally located in the air filter 16. The removable lid 18 held in place by a wing nut 20 is used to provide access to the air filter 16 as well as to the venturi injector 10. The applicants venturi injector 10 used with the novel liquid injection system is used with an internal combustion engine having an intake manifold 22 such as a gasoline engine or the like.

Positioned outside of the air cleaner housing 12 is a liquid level control chamber 24 which may be mounted on the outside of the air cleaner housing 12 or in a remote location in proximity to the air cleaner housing. A liquid line such as copper tubing 26 serves as a means for connecting the liquid level control chamber 24 and the venturi injector 10. The venturi injector 10 as will be described more fully hereinafter contains a copper tube 27 fixedly attached thereto which is joined to the liquid line 26 by means known in the art.

The liquid level control chamber 24 contains a needle valve 28 which is positioned in the bottom portion of the control chamber and is used to control the ratio of water to gasoline being injected into the carburetor 14 and to insure that the ratio remains reasonably constant over the throttle range of the internal combustion engine.

The liquid level control chamber 24 should be mounted in such a position that the water level of the liquid level control chamber 24 is lower than the outlet of the venturi injector 10. This is shown by the numeral 30 in FIG. 1 and will be described more fully hereinafter when referring to the details of the venturi injector. The liquid level control chamber 24 may be mounted to the air cleaner housing 12 by means of a clamp not shown in the drawing which is provided with the complete liquid injector system as sold by the applicant.

A clean-out plug 32 is positioned within a drilled and tapped hole not shown in the drawing to provide access to the internal portions of the liquid level control chamber 24. The liquid level control chamber 24 contains water 34 or alcohol or a mixture of water and alcohol as will be described more fully hereinafter. The chamber 24 also contains a pair of electrical probes 36 and 38 which are positioned within the liquid level control chamber 24 and are designed to act as an electrical switch within the liquid contained in the control chamber to open and close responsive to a predetermined liquid level in the control chamber. The electrical probes 36 and 38 acting as a switch then control the operation of a remotely positioned pumping means 42 contained on a remote liquid tank 40 which may be mounted in an accessable place within the automobile engine compartment.

From this it can be seen that the remote liquid tank 40 would be filled with the water or alcohol or water-alcohol mixture required to be injected into the carburetor 14 with the pump 42 serving to pump the mixture 44 through the tube 46 to the top of the liquid level control chamber 24 through the fitting 116 on the exterior of the control chamber.

Electrical lines 48 and 50 electrically connect the pumping means 42 to the control circuit while electrical lines 112 and 114 connect the electrical probes 36 and 38 to the control circuit as will be described more fully hereinafter.

The pumping means 42 contains a male inlet 52 which is threaded and is positioned through a hole, not shown in the drawing drilled in the side of the remote liquid tank 40 as shown in FIG. 1 of the drawing. A grommet 54 is positioned around the male inlet 52 and a plastic nut or washer 56 would be threaded on the male inlet 52 in order to tightly connect the pumping means 42 onto the remote liquid tank 40.

The pumping means 42 would also contain a male outlet fitting 58 which would be connected to the tubing 46 by means known in the art thereby making a complete hydraulic connection between the remote liquid tank 40 and the liquid level control chamber 24.

Referring now to FIG. 2 of the drawing there can be seen how the remote liquid tank 40 would contain a lid 60 which would be snapped onto a flange 62 contained on the upper portion of the remote liquid tank 40. A pair of screws 64 would be used to fixedly attach the lid 60 to the flange 62 to prevent the lid from vibrating off of the tank 40 thereby allowing dirt to enter into the tank.

A removable snap-on cap 66 would be held by a strap 68 and used to provide access to the tank 40 in order to fill it with the mixture of liquid used. A flange 70 would be formed on the cap 66 for easy removal of the cap in order to fill the tank 40.

The control means, shown generally by the numeral 72 is detailed more fully in FIG. 9 of the drawing and will be described hereinafter. The control means serves as the means to operate the pumping means 42 to supply liquid mixture to the liquid level control chamber 24 when called for by the electrical probes 36 and 38.

Referring now to FIG. 3 of the drawing there is shown in more detail the mounting of the venturi injector 10 within the carburetor 14. The venturi injector 10 may be formed in the preferred embodiment as a reducing tube fitting 74 positioned as shown partially in the carburetor 14 and partially outside of the carburetor within the central portion of the air filter 16 within the air cleaner housing 12. As has been before mentioned a copper tube 27 would be fixedly attached to the reducing tube fitting 74 as will be described more fully hereinafter and would be positioned through a hole 75 drilled in the air cleaner housing 12 as shown in FIG. 3. The copper tube 27 would be bent and shaped as shown in FIG. 3 to allow the venturi injector 10 to be positioned as shown partly within and partly without of the carburetor. The copper tube 27 would be bent so as to pass over the edge of the carburetor 76 and would allow the venturi injector 10 to be mounted as shown in such a manner as not to interfere with the normal operation of the butterfly valve 77 used with the carburetor 14. When mounted in this manner as shown in FIG. 3, inflowing air, shown by the arrow 78 would pass through the venturi injector 10 formed from the reducing tube fitting 76 and would pass out of the injector 35 drawing water from the liquid level control chamber 24. The water/air mixture is shown by the arrow 80 in the drawing FIG. 3.

The air 78 being pulled into the throat of the carburetor 14 by the normal action of the internal combustion engine rushes through the venturi 10 which causes water or liquid mixture to be pulled into the venturi from the liquid level control chamber 24 through the liquid line 26 and the copper tube 27 which is connected together at 81 by known means in the art. The rushing air causes the water mixture to be pulled into the venturi injector 10 and into the throat of the carburetor 14 mixing the water or liquid 34 with the air 78 and gasoline into a more combustable mixture. The ratio of water and/or alcohol or a water-alcohol mixture is controlled by the needle valve 28 and remains constant over the throttle range for the internal combustion engine.

It is within the spirit and scope of the invention that a second venturi injector 10 could be mounted in the throat of a four barrel carburetor 14 in the secondary barrels. Such modified mounting would be important for heavier vehicles such as trucks or recreational vehicles which do a lot of pulling or climbing and would provide the necessary improved combustable mixture for these vehicles.

In operation it has been found that the liquid used in the applicants system is preferably water but may also be a mixture of water and alcohol with the alcohol serving to prevent freezing of the water in freezing weather and also serving to increase combustion in the combustion engine due to the combustion characteristics of the alcohol. Straight alcohol or other supplements could also be used as the liquid with modifications in the system. It has also been found preferable that the alcohol/water mixture be approximately one and one-half cups of alcohol to one gallon of water to prevent freezing in the winter time. In addition a one quarter cup of alcohol per gallon of water may be used in the system during warm weather to keep the system clean. The use of the gasoline-air-water mixture from the liquid injection system of the applicants design results in a more complete combustion in the internal combustion engine thereby reducing carbon accumulation and resulting in a smoother and more efficient running engine.

While the applicants basic system has been designed to use with an internal combustion gasoline engine, it is within the spirit and scope of the invention that the novel liquid injection system as herein disclosed may also be used with an internal combustion diesel engine, a fuel injected internal combustion engine and a turbocharged internal combustion engine with minor modifications in the basic system. The applicants novel injection system can also be used with an aircraft engine after minor modifications.

Referring now to the drawing FIGS. 4–6, there will be described in more detail the novel venturi injector 10 hereinbefore described which comprises in the preferred embodiment a reducing tube fitting 74 having an elongated body comprising an upper cylindrical section 79A and a lower cylindrical section 79B formed of a smaller diameter. The section 79A and 79B are fixedly attached together by an intermediate section 79C which is tapered to connect the sections of different diameter together. A hollow copper tube 27 is fixedly attached to the intermediate section 79C through a drilled hole 82 and is soldered or brazed to provide a water tight connection at that position. The hollow tube 27 is positioned partially within the intermediate section as shown by the dashed lines in FIG. 4 and also extends a predetermined distance outside of the venturi injector so that it can be bent to the configuration shown in FIG. 3 and be connected to the liquid line 26 at point 81 as shown in FIG. 3.

The hollow tube portion extending within the intermediate section 79C is constructed with a sloped end for improved venturi action of the venturi injector.

It can be seen in FIG. 5, how the copper tube 27 would be positioned within the intermediate section 79C to a distance approximately in the center shown by the arrow 88. The sloped end on the copper tube 27 is shown by the numeral 92 and results in an angle 94 of approximately 45 degrees.

The top edge 84 of the venturi injector would then be positioned within the air cleaner housing 12 so as to allow unrestricted flow of air 78 as shown in FIG. 3 of the drawing and the end of the tube 86 would be positioned within the injector to provide the optimum performance of the injector unit. The bottom edge 90 of the lower cylindrical section 79B would also be mounted so as not to interfere with the butterfly valve 77 in the carburetor 14 of the internal combustion engine.

As has been before mentioned it is preferable in the applicants system to have the water level of the liquid level control chamber 24 be lower than the outlet of the venturi tube 27 in order to provide a proper venturi action in the applicants system by preventing gravity flow of water to the venturi.

Referring now to the drawing FIGS. 7 and 8 there will be shown and described in more detail the liquid level control chamber 24 which may be formed in the preferred embodiment from a pipe sleeve 96 formed from PVC pipe and a top cap 98 and a bottom cap 100 also formed from PVC material. An adhesive 102 is used to adhesively secure the pipe sleeve 96 to the top cap 98 and the bottom cap 100 after the internally positioned electrical probes 36 and 38 have been inserted into the unit through the seals 120 and 122 and connected to the electrical wires 106 and 108. A clamp 100 is fixedly attached to the outside of the top cap 98 by screws 111 to hold the wires in place. Terminal plug connectors 112 and 114 are electrically attached to the electrical wires 106 and 108 for connection to the control system.

As has been before mentioned the liquid level control chamber 24 contains a male outlet plug 116 for connection to the tube 46. The male outlet plug 116 is positioned within a drilled and tapped hole, not shown in the drawing, in the top cap 98. As has also been mentioned before, the bottom cap 100 contains a needle valve 28 which is positioned in a drilled and tapped hole, not shown in the drawing, through the bottom cap 100 and the pipe sleeve 96. The needle valve 28 also contains a female outlet fitting 118 for connection to the liquid line 26 to the venturi injector 10.

The electrical probe 36 may be formed in a semi-circular configuration as shown in FIG. 8 of the drawing and surrounds the electrical probe 38 which may be formed in an L-shaped configuration shown in FIGS. 7 and 8 of the drawing. Since the electrical probes 36 and 38 act as a switch, the distance, shown by the numeral 104 between the probe ends would determine the fluctuation of the liquid level and the liquid level control chamber 24. This distance may be varied according to predetermined designs for the various types of internal combustion engines which the system may be used with all within the spirit and scope of the invention. The electrical probes 36 and 38 would preferably be formed of stainless steel to eliminate corrosion but may also be formed of other electrical conductive materials within the spirit and scope of the invention.

The semi-circular configuration of the electrical probe 36 is intended to maintain maximum electrical contact between the probes, despite the normal vehicle movement, unless the water level in the liquid level chamber 24 is low. This acts to prevent erratic action of the water pump 42. By making the center probe 38 as long as possible, it gives maximum contact with the water for electrical conductivity. The upper probe 36 designed in a semi-circle causes the water to maintain contact between the probes at all times unless the water level is low.

Referring now to FIGS. 10-12 of the drawing there will be shown in detail the various components of the control circuit 72 used in the applicants novel injection system to operate the pumping means 42 and to perform various other operational features used in the system. The electrical components of the applicants control circuit 72 shown in FIG. 9 are positioned on a circuit board 130 as shown in FIG. 10 of the drawing which is fixedly attached to a heat sink 126. A transistor 152 is attached to the heat sink 126 by means of the bolt and nut 150. The transistor 152 must be electrically insulated from the heat sink 126 by the use of a mica washer and an insulating ring to prevent short-circuiting the system when the heat sink 126 is fastened to the structure of the vehicle. These parts are similar to Radio Shack part #276-1373A, which is a TO-220 transistor mounting kit.

The heat sink 126 may be attached to a heat dissapating structure of the automobile by means of a heat sink bolt 146 positioned through a hole 128 drilled in the heat sink 126. The heat sink bolt 146 will be bolted to the car frame 148.

The circuit board 130 contains a plurality of holes 132 through which the plurality of wires 134, 136, 138 and 140 are positioned to be electrically connected to the various components in the control circuit. The resistor 142 may be positioned on one side of the circuit board 130 as shown in FIG. 10 while the capacitor 154 may be positioned on the other side of the circuit board as shown in FIG. 12.

A non-conductive electrical cover such as rubber or some other suitable material 144 would be positioned over the incoming wires 134, 136, 138 and 140 and the entire circuit board 132 as well as the transistor 152 and other components may be sealed with an epoxy to prevent entrance of moisture. A plastic tubular cover 124 would be positioned around the circuit board 132 and would serve to provide physical protection to the delicate transistor 152 and other electrical components. In FIGS. 10-12 of the drawing, the plastic tube 124 has been shown slid away from the circuit board 130 for purposes of clarity. In operation, the plastic tube 124 would be slid in the direction shown by the arrow 125 to encircle the circuit board 130 thereby protecting the transistor 152 as well as the other electrical components. The operating position of the plastic tube 124 after it has been positioned over the transistor 152 is shown in FIG. 9 of the drawing where the transistor 152 is shown in dashed lines positioned within the plastic tube.

Referring now to FIG. 9 of the drawing there is shown the control means 72 for operation of the applicants venturi system to pump the water 44 from the remote tank 40 by means of the pump 42 to the liquid level control chamber 24. A transistor 152 is maintained in an "on" state by a positive power applied to the "gate" through the 68k ohm resistor 142. This causes the pumping means 42 to bring the water level 34 in the liquid level control chamber 24 high enough to make contact between both of the electrical probes 36 and 38 in the liquid level control chamber. As a result a negative power is applied to the "gate" of the transistor 152 which causes the transistor to no longer conduct thereby shutting off the pump 42. The pump 42 is shown by the numeral 156 in the control circuit of FIG. 9 and a buzzer or pilot light 158 is connected in parallel to the pump 156 so that it is on when the pump is on. The buzzer or pilot light 158 as well as a switch 160 are mounted in the drivers compartment of the internal combustion vehicle and the switch 160 controls all power to the control circuit. A fuse 162 of approximately 2 amps. would be connected to the switch 160 on one side thereof and would be connected on the other side to a twelve volt positive connection at 164 to provide positive electrical flow to the control circuit. The ground 166 would be connected as shown through the line 172 to the transistor 152. The electrical probe 36 of the liquid level control chamber 124 would be connected through electrical lines 170 and the electrical probe 38 would be connected through the electrical line 168 to the transistor 152. It can be seen then that the electrical line 112 shown in FIG. 1 would be connected to the electrical line 170 shown in FIG. 9 while the electrical line 114 shown in FIG. 1 would be connected to the electrical line 168 shown in FIG. 9 for correct operation of the electrical probe switch.

The capacitor 154 across the power source and the "gate" of the transistor 152 acts as a time delay to prevent erratic operation of the pump 42.

In operation, when the pump 42 is pumping, the buzzer or pilot light 158 will be on in the drivers compartment of the vehicle, giving some indication of the amount of water or liquid mixture that is being used in the applicants system. A constant tone of the buzzer 158 would be an indication of low water supply in the remote liquid tank 40 signalling the driver to refill the tank at the first opportunity. Should this happen, the switch 160 could be turned off until the water supply could be replenished.

It has been found from experimentation that the best injected water to gasoline mixture ratio varies with different internal combustion vehicles; however a good starting place for operation of a system is approximately one pint or less of water used for every one hundred miles of vehicle operation. The applicants novel system works best if the ignition timing of the internal combustion engine is adjusted several degrees faster than normal and the liquid level control chamber 24 should be mounted so that the water level in the chamber is about one inch below the venturi injector inlet as has been before described. The needle valve 28 may be adjusted to compensate for level variations in mounting of the liquid level control chamber 24.

In the preferred embodiment, the copper tube 27 may be preferably formed of three-sixteenths inch copper tubing and would be formed about fifteen inches long and would be welded or connected in some other manner to the venturi injector 10 formed from the reducing tube fitting 74. This fitting would preferably be a three-quarter inch by one-half inch sweat copper tubing reducer but may be formed in other configurations and sizes within the spirit and scope of the invention. All of the connecting wires in the applicants system would be plugged together by suitable electrical connectors and would be fully color coded to make installation of the injection system easier for the purchaser.

In the preferred embodiment shown, the transistor 152 would preferably be a power mosfet number 1RF511 of the type manufactured by Radio Shack of Fort Worth, Tex. and sold as catalog #276-2072 or some other suitable transistor manufactured by other manufacturers. The power mosfet 1RF511 is very fast switching with low-drive current and a low on-state resistance. Its electrical specifications are 2-4 volts gate threshold voltage and an on-state resistance of 0.6 ohms (max.). The forward transconductance is 1.5 mhos with an input capacitance of 150 pf (max.) and an output capacitance of 100 pf (max.). The electrical schematic of the power mosfet transistor 152 is shown in FIG. 13 of the drawings. The capacitor 154 would be a fifteen volt capacitor of 6.8 microfarad capacity and the resistor 142 would be a 68k ohm-¼ watt resistor.

After the applicants system has been installed and in operation, the vehicle in which the system is mounted should be driven for several miles at moderate speed since accumulated carbon in the engine will be released by the injection of water into the engine and will be blown out the exhaust system. The buzzer 158 and the pumping means 42 should run about once every one to four miles of vehicle operation when the injection system is operating properly depending upon the vehicle speed and the terrain over which the vehicle is moving.

Adjustment of the needle valve 28 on the liquid level control chamber 24 can be made to insure the proper operation of the pump.

The control switch 160 mounted on the dashboard of the vehicle, may be turned off at any time that the operator does not desire to inject water into the internal combustion engine. It is also been found from experimentation that in very cold weather, it is best to reduce the amount of water being injected because of possible icing in the throat of the carburetor 14.

In summary the applicants liquid injection system hereinbefore described accomplishes all of the objects and advantages of the invention. The applicants system is much simpler than any other known system on the market today and requires no connection to the internal combustion engines vehicle system or to the intake manifold vacuum system of the combustion engine. The applicants system does not depend on a computer to meter the water use thereby increasing the reliability of the applicants system and leaving less room for maintenance problems. The water pump 42 runs only occasionally thereby increasing the pump life and the venturi method of injection breaks the water into more of a vapor or mist than any other system that merely pumps the water into the internal combustion engine. This causes more effective mixing of the injected water with the fuel and air going to the internal combustion engine and gives a more complete combustion of fuel.

The applicants novel liquid injection system is adaptable to use in diesel engines and also in fuel injected and turbo-charged engines by installing the venturi injector in the intake airstream of these engines. This would cause water to be drawn into the manifold where it would mix with the fuel being used to again cause more complete combustion. The applicants system is also adaptable to use on motorcycles and aircraft engines with modifications since the applicants system is designed so that an unlevel condition of the vehicle would have little or no adverse affect on its operation. With simple changes in the structure of the liquid level control chamber 24 and its operating "switch" in the form of the electrical probes 36 and 38, adaptation of the basic system can be made to many internal combustion vehicles within the spirit and scope of the invention.

From the foregoing it can be seen that the applicants system accomplishes all of the important objects and advantages hereinbefore outlined. Nevertheless it is within the spirit and scope of the invention that changes and modifications may be made in the system and arrangement of the parts and in the particular parts of the invention and the applicant is not to be limited to the exact embodiment shown and described which has been given by way of illustration only.

Having shown and described my invention, I claim:

1. A liquid injection system for use with an internal combustion engine having a carburetor and an air cleaner housing, the system being designed to inject a predetermined amount of an external liquid, responsive to changes in vacuum in the air cleaner housing and in the carburetor, into at least one of the carburetors of the internal combustion engine from the proximity of the air cleaner and through the carburetor's air intake and within the air cleaner housing, and within the air cleaner, comprising:

(a) a venturi injector, positioned within the air cleaner housing and within the air cleaner and mounted in proximity to the carburetor air intake to be responsive to changes in vacuum in the air cleaner housing and in the carburetor caused by changes in load on the internal combustion engine;

(b) a liquid level control chamber, positioned outside of the air cleaner housing and having a predetermined liquid level contained within the chamber, the liquid level control chamber being positioned at a predetermined level relative to the venturi injector;

(c) means, associated with the venturi injector and the liquid level control chamber, for connecting the venturi injector and the control chamber together so that liquid can be drawn from the chamber and through the connecting means by the vacuum action of the venturi injector responsive to changes in vacuum in the air cleaner housing and in the carburetor;

(d) a remote liquid tank, for holding a predetermined quantity of liquid and being positioned as desired by the owner of the internal combustion engine;

(e) pressure pumping means, associated with the remote liquid tank, for pumping liquid by pressure from the tank to the liquid level control chamber;

(f) a tube connecting the pump means to the liquid level control chamber for conveying the pumped liquid to the liquid level control chamber; and (g) means, associated with the liquid level control chamber and the pumping means, to control the pumping means to activate or de-activate the pumping means responsive to a pre-set liquid level in the liquid level control chamber.

2. The injection system as defined in claim 1 wherein the venturi injector is formed from a reducing tube fitting and has positioned therein a portion of the connecting means.

3. The injection system as defined in claim 2 wherein the portion of the connecting means positioned within the reducing tube fitting is cut at an angle to enhance the action of the venturi.

4. The injection system as defined in claim 1 wherein the connecting means comprises in part a tube connected to the venturi injector and further comprises a needle valve connected to the liquid level control chamber and to the tube for controlling the amount of liquid drawn from the liquid level control chamber by the venturi injector.

5. The injection system as defined in claim 1 wherein the pumping means is fixedly attached to and hydraulically connected to the remote liquid level tank.

6. The injection system as defined in claim 1 wherein the control means, comprises, in part, a pair of electrical probes positioned within the liquid level control chamber designed to act as an electric switch within the liquid contained in the control chamber, to open and close responsive to a predetermined liquid level in the control chamber.

7. The liquid injection system as defined in claim 1 wherein the liquid used is water.

8. The liquid injection system as defined in claim 7 wherein the liquid used is a mixture of alcohol and water, the alcohol serving to prevent freezing of the water in freezing weather and also to increase combustion in the combustion engine due to the combustion characteristics of the alcohol.

9. The liquid injection system as defined in claim 8 wherein the alcohol/water mixture is approximately one and one half cups of alcohol to one gallon of water.

10. The liquid injection system as defined in claim 8 wherein the alcohol/water mixture is approximately one quarter cup of alcohol per gallon of water.

11. A liquid injection system for use with an internal combustion engine having an air cleaner and an air cleaner housing, the system being designed to inject a predetermined amount of an external liquid, responsive to changes in vacuum in the air cleaner housing, into tha internal combustion engine from within the air cleaner housing, and within the air cleaner comprising:

(a) a venturi injector, positioned within the air cleaner housing and within the air cleaner and mounted in proximity to the air intake to the engine to be responsive to changes in vacuum in the air cleaner housing caused by changes in load on the internal combustion engine;

(b) a liquid level control chamber, positioned outside of the air cleaner housing and having a predetermined liquid level contained within the chamber, the chamber being positioned at a predetermined level relative to the venturi injector;

(c) means, associated with the venturi injector and the liquid level control chamber, for connecting the venturi injector and the control chamber together so that liquid can be drawn from the chamber and through the connecting means by the vacuum action of the venturi injector responsive to changes in vacuum in the air cleaner housing;

(d) a remote liquid tank, for holding a predetermined quantity of liquid and being positioned as desired by the owner of the internal combustion engine;

(e) pressure pumping means, associated with the liquid tank, for pumping liquid by pressure from the tank to the liquid level control chamber;

(f) a tube connecting the pump means to the liquid level control chamber for conveying the pumped liquid to the liquid level control chamber; and (g) means, associated with the liquid level control chamber and the pumping means, to control the pumping means to activate or de-activate the pumping means responsive to a pre-set liquid level in the liquid level control chamber.

12. The injection system as defined in claim 11 wherein the venturi injector is formed from a reducing tube fitting and has positioned therein a portion of the connecting means.

13. The injection system as defined in claim 12 wherein the portion of the connecting means positioned within the reducing tube fitting is cut at an angle to enhance the action of the venturi.

14. The injection system as defined in claim 11 wherein the connecting means comprises in part a tube connected to the venturi injector and further comprises a needle valve connected to the liquid level control chamber and to the tube for controlling the amount of liquid drawn from the liquid level control chamber by the venturi injector.

15. The injection system as defined in claim 11 wherein the pumping means is fixedly attached to and hydraulically connected to the remote liquid level tank.

16. The injection system as defined in claim 11 wherein the control means, comprises, in part, a pair of electrical probes positioned within the liquid level control chamber designed to act as an electric switch within the liquid contained in the control chamber, to open and close responsive to a predetermined liquid level in the control chamber.

17. The liquid injection system as defined in claim 11 wherein the liquid used is water.

18. The liquid injection system as defined in claim 17 wherein the liquid used is a mixture of alcohol and water, the alcohol serving to prevent freezing of the water in freezing weather and also to increase combustion in the combustion engine due to the combustion characteristics of the alcohol.

19. The liquid injection system as defined in claim 18 wherein the alcohol/water mixture is approximately one and one-half cups of alcohol to one gallon of water.

20. The liquid injection system as defined in claim 18 wherein the alcohol/water mixture is approximately one quarter cup of alcohol per gallon of water.

21. The liquid injection system as defined in claim 11 wherein the system is used with an internal combustion gasoline engine.

* * * * *